US009405840B2

(12) United States Patent
Nielsen et al.

(10) Patent No.: US 9,405,840 B2
(45) Date of Patent: Aug. 2, 2016

(54) USING SOCIAL SIGNALS TO RANK SEARCH RESULTS

(71) Applicant: MICROSOFT TECHNOLOGY LICENSING, LLC, Redmond, WA (US)

(72) Inventors: Olivier Yves Marie Jais Nielsen, London (GB); Daniel Déchelotte, Houilles (FR); Xavier Dupré, Paris (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 13/729,829

(22) Filed: Dec. 28, 2012

(65) Prior Publication Data

US 2014/0188839 A1    Jul. 3, 2014

(51) Int. Cl.
 G06F 17/30    (2006.01)
 G06Q 50/00   (2012.01)
(52) U.S. Cl.
 CPC ...... G06F 17/3087 (2013.01); G06F 17/30867 (2013.01); G06Q 50/01 (2013.01)
(58) Field of Classification Search
 CPC .......... G06F 17/30867; G06F 17/3053; G06F 17/3087; G06Q 50/01
 USPC ......................................................... 707/711
 See application file for complete search history.

(56) References Cited

U.S. PATENT DOCUMENTS

| 7,330,883 B1* | 2/2008 | Jessup | G06F 17/3087 |
| | | | 455/414.3 |
| 8,549,061 B2* | 10/2013 | Rao | G06Q 30/08 |
| | | | 709/200 |
| 2006/0129452 A1* | 6/2006 | Nordberg | G06Q 10/10 |
| | | | 705/14.46 |
| 2006/0184640 A1* | 8/2006 | Hatch | G06F 17/3087 |
| | | | 709/217 |
| 2007/0208613 A1* | 9/2007 | Backer | G06Q 10/107 |
| | | | 715/234 |
| 2009/0055355 A1* | 2/2009 | Brunner | G06Q 30/02 |
| 2009/0282002 A1 | 11/2009 | Reeder et al. | |
| 2010/0100543 A1* | 4/2010 | Brady | G06F 17/30613 |
| | | | 707/732 |

(Continued)

OTHER PUBLICATIONS

Jin, et al., "Ranking Entities on the Web using Social Network Mining and Ranking Learning", In Proceedings of the 17th International Conference on World Wide Web, Apr. 21, 2008, 10 pages.

(Continued)

*Primary Examiner* — Huawen Peng
(74) *Attorney, Agent, or Firm* — Dave Ream; Tom Wong; Micky Minhas (57) ABSTRACT

Systems, methods, and computer-readable storage media are provided for using social signals to rank local search results. Local entity website addresses are matched with social network addresses and social network profiles are matched with local entity index records. Once it is known that a particular address or local entity index record aligns with a particular social network address or profile, interest signals associated with the social network are utilized to rank the particular address or local entity index record among other search results. In this way, the social network popularity of an entity may be taken into account in determining whether to provide information about the entity as a search result. Additionally, ranking may be improved for entities having incomplete or erroneous information available in association with a social network and for entities having a strong social network presence but a limited web presence.

20 Claims, 9 Drawing Sheets

(56) References Cited

U.S. PATENT DOCUMENTS

| | | |
|---|---|---|
| 2010/0153371 A1 | 6/2010 | Singh |
| 2010/0169324 A1 | 7/2010 | Shnitko et al. |
| 2011/0022602 A1 | 1/2011 | Luo et al. |
| 2011/0093346 A1 | 4/2011 | Lunt et al. |
| 2011/0145219 A1* | 6/2011 | Cierniak ........... G06F 17/30867 707/709 |
| 2012/0016875 A1 | 1/2012 | Jin et al. |
| 2013/0030905 A1* | 1/2013 | Fuloria ................. G06Q 50/01 705/14.39 |
| 2013/0117191 A1* | 5/2013 | Jagota ................... G06Q 10/06 705/320 |

OTHER PUBLICATIONS

"Social Media is Changing SEO. Is Joomla Web Site Ready?", Retrieved on: Feb. 23, 2012, Available at: http://anything-digital.com/sh404sef/news/social-media-is-changing-seo-is-your-joomla-web-site-ready.html.

* cited by examiner

USING SOCIAL SIGNALS TO RANK SEARCH RESULTS

BACKGROUND

In the context of local listing search engines, it is desirable for places, local businesses, and other local entities to be ranked appropriately among algorithmically derived search results if they have a strong presence and/or are popular on social network websites, e.g., Facebook®. Current methods of taking into account popularity in the process of ranking local entities are based on the web presence of the entities (for instance, the number of websites that mention the entity) or online review websites from which ratings are present in a local entity index. The first approach has at least two shortcomings. First, the web presence is based on the appearance of a local entity among the results of a web search engine, which is limited by the coverage of the search engine itself, and which does not consider whether the entity is negatively or positively mentioned. Second, while social networks are an increasingly important part of the web, a popular entity on such networks does not necessarily have a strong presence on the "regular" web. A shortcoming of the second approach is that it requires the local entity data source to provide the ratings.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for using social signals to determine and rank local search results. Local entity website addresses are matched with social network website addresses and/or social network profiles are matched with local entity index records. Once it is known that a particular website address or local entity index record aligns with a particular social network website address or profile, social interest indications or signals (e.g., "likes," "check-ins," fan status, and the like) associated with the social network may be utilized to rank the particular website address or local entity index record among other algorithmically derived search results. In this way, the social network popularity of an entity may be taken into account in determining whether to provide information about the entity as a search result or in addition to one or more search results. Additionally, ranking may be improved for entities having incomplete or erroneous information available in association with a social network and for entities having a strong social network presence but a limited web presence.

BRIEF DESCRIPTION OF THE DRAWINGS

The present invention is illustrated by way of example and not limitation in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for using social signals (social interest indications) to determine and rank local search results. Local entity website addresses are matched with social network website addresses and social network profiles are matched with local entity index records. Once it is known that a particular website address or local entity index record aligns with a particular social network website address or profile, social interest indications or signals (e.g., "likes," "check-ins," fan status, and the like) associated with the social network may be utilized to rank the particular website address or local entity index record among other algorithmically derived search results. In this way, the social network popularity of an entity may be taken into account in determining whether to provide information about the entity as a search result or in addition to one or more search results. Additionally, ranking may be improved for entities having incomplete or erroneous information available in association with a social network and for entities having a strong social network presence but a limited web presence.

Accordingly, one embodiment of the present invention is directed to one or more computer-readable storage media storing computer-useable instructions that, when used by one or more computing devices, cause the one or more computing devices to perform a method for matching local entity website addresses with social network website addresses. The method includes receiving a plurality of local entity website addresses, each local entity website address being associated with a local entity. For each of the plurality of local entity website addresses, the method further includes extracting a first web address domain and determining whether the first web address domain is a special domain (that is, whether the first web address domain is common among a threshold number of website addresses). Upon determining that a first web address domain is special, the method further includes extracting a first identifier from the local entity website address associated with the first web address domain, and assigning a first confidence code to the local entity website address associated with the first web address domain, the first confidence code comprising the first web address domain and the first identifier. Upon determining that the first web address domain is not special, the method further includes assigning a second confidence code to the local entity website address associated with the first web address domain, the second confidence code comprising the first web address domain.

In embodiments, the method further includes receiving a plurality of social network website addresses, each associated with one or more interest indications. For each of the plurality of social network website addresses, the method further includes extracting a second web address domain and determining whether the second web address domain is special (that is, whether the second web address domain is common among a threshold number of website addresses). Upon determining that the second web address domain is special, the method further includes extracting a second identifier from the social network website address associated with the second web address domain, and assigning a third confidence code to the social network website address associated with the second web address domain, the third confidence code comprising the second web address domain and the second identifier. Upon determining that second web address domain is not special, the method further includes assigning a fourth confidence code to the social network website address associated with the second web address domain, the fourth confidence code comprising the second web address domain.

In embodiments, the method further includes identifying potential matches between one or more of the plurality of local entity website addresses and one or more of the plurality of social network website addresses based upon matching of the respective first, second, third, or fourth confidence codes. In embodiments, the method further includes receiving a local search query, determining a plurality of search results, including at least one of the plurality of local entity website addresses, determining that there is an actual match between the at least one of the plurality of local entity website addresses and one of the plurality of social network website addresses, and utilizing the one or more interest indications associated with the one of the plurality of social network website addresses in ranking the at least one of the plurality of local entity website addresses relative to others of the plurality of search results.

In another embodiment, the present invention is directed to one or more computer-readable storage media storing computer-useable instructions that, when used by one or more computing devices, cause the one or more computing devices to perform a method for matching social network profiles with local entity index records. The method includes receiving a social network profile, the social network profile including a plurality of first information fields, at least a portion of the plurality of first information fields having a value associated therewith; receiving a record associated with a local entity index, the record including a plurality of second information fields, at least a portion of the plurality of second information fields having a value associated therewith; determining that one or more of the plurality of first information fields align with one or more of the plurality of second information fields; and determining a similarity score for the social network profile and the record associated with the local entity index by calculating a similarity metric for each pair of aligned first and second information fields based upon respective values associated therewith. In embodiments, if the determined similarity score is above a threshold value, the social network profile and the record associated with the local entity index are determined to match. In embodiments, the method further comprises receiving a local search query, determining a plurality of search results; and utilizing one or more interest indications associated with the social network profile to rank the record associated with the local entity index relative to the plurality of search results.

In yet another embodiment, the present invention is directed to a system including a server having one or more processors and one or more computer-readable storage media, and a data store coupled with the server. The server is configured to receive a plurality of local entity website addresses, each local entity website address being associated with a local entity. For each of the plurality of local entity website addresses, the server further is configured to extract a first web address domain, and determine whether the first web address domain is a special domain (that is, whether the first web address domain is common among a threshold number of website addresses). Upon determining that a first web address domain is special, the server is further configured to extract a first identifier from the local entity website address associated with the first web address domain and assign a first confidence code to the local entity website address associated with the first web address domain, the first confidence code comprising the first web address domain and the first identifier. Upon determining that the first web address domain is not special, the server further is configured to assign a second confidence code to the local entity website address associated with the first web address domain, the second confidence code comprising the first web address domain.

In embodiments, the server further is configured to receive a plurality of social network website addresses, each associated with one or more interest indications. For each of the plurality of social network website addresses, the server is configured to extract a second web address domain and determine whether the second web address domain is special (that is, whether the second web address domain is common among a threshold number of website addresses). Upon determining that the second web address domain is special, the server is further configured to extract a second identifier from the social network website address associated with the second web address domain, and assign a third confidence code to the second web address domain, the third confidence code comprising the second web address domain and the second identifier. Upon determining that second web address domain is not special, the server further is configured to assign a fourth confidence code to the social network website address associated with the second web address domain, the fourth confidence code comprising the second web address domain.

In embodiments, the server further is configured to receive a social network profile, the social network profile including a plurality of first information fields, at least a portion of the plurality of first information fields having a value associated therewith; receive a record associated with a local entity index, the record including a plurality of second information fields, at least a portion of the plurality of second information fields having a value associated therewith; determine that one or more of the plurality of first information fields align with one or more of the plurality of second information fields; and determine a similarity score for the social network profile and the record associated with the local entity index by calculating a similarity metric for each pair of aligned first and second information fields based upon respective values associated therewith.

In embodiments, the system further includes a search engine having one or more processors and one or more computer-readable storage media and a data store coupled with the search engine. The search engine is configured to receive a local search query; determine a plurality of search results, including at least one of the plurality of local entity website addresses; determine that there is an actual match between the at least one of the plurality of local entity website addresses and one of the plurality of social network website addresses; and utilize the one or more interest indications associated with the one of the plurality of social network website addresses in ranking the at least one of the plurality of local entity website addresses relative to others of the plurality of search results. In embodiments, the search engine further is configured to receive a local search query, determine a plurality of search results, and utilize the one or more interest indications associated with the social network profile to rank the record associated with the local entity index relative to the plurality of search results.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, and/or refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

Figure 1:
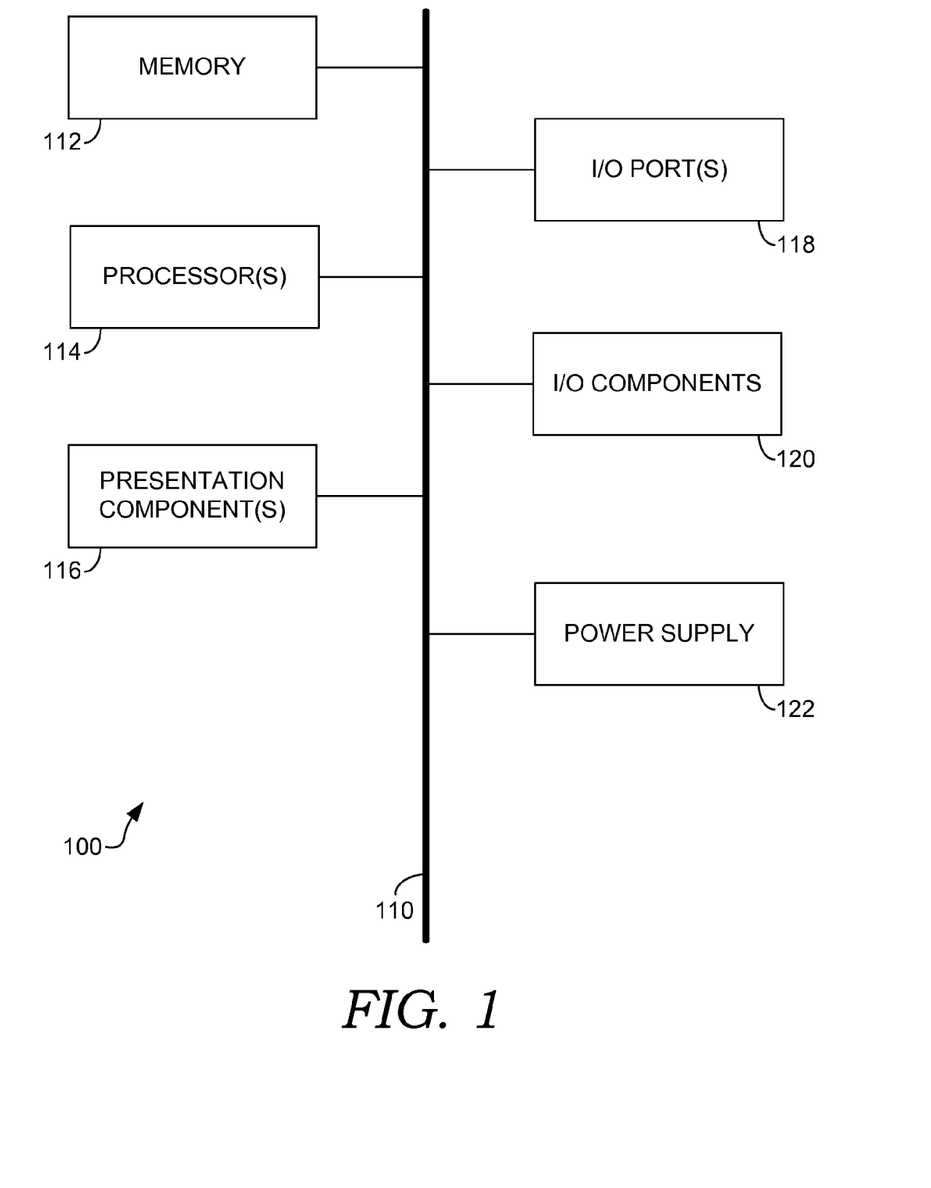
FIG. 1 is a block diagram of an exemplary computing environment suitable for use in implementing embodiments of the present invention.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterates that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like. Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "search engine" is used herein, it will be recognized that this term may also encompass a server, a Web browser, a set of one or more processes distributed on one or more computers, one or more stand-alone storage devices, a set of one or more other computing or storage devices, a combination of one or more of the above, and the like.

As previously mentioned, embodiments of the present invention are generally directed to systems, methods, and computer-readable storage media for using social signals to determine and rank local search results. Local entity website addresses are matched with social network website addresses and social network profiles are matched with local entity index records. Once it is known that a particular website address or local entity index record aligns with a particular social network website address or profile, social interest indications or signals (e.g., "likes," "check-ins," fan status, and the like) associated with the social network may be utilized to rank the particular website address or local entity index record among other algorithmically derived search results.

Figure 2:
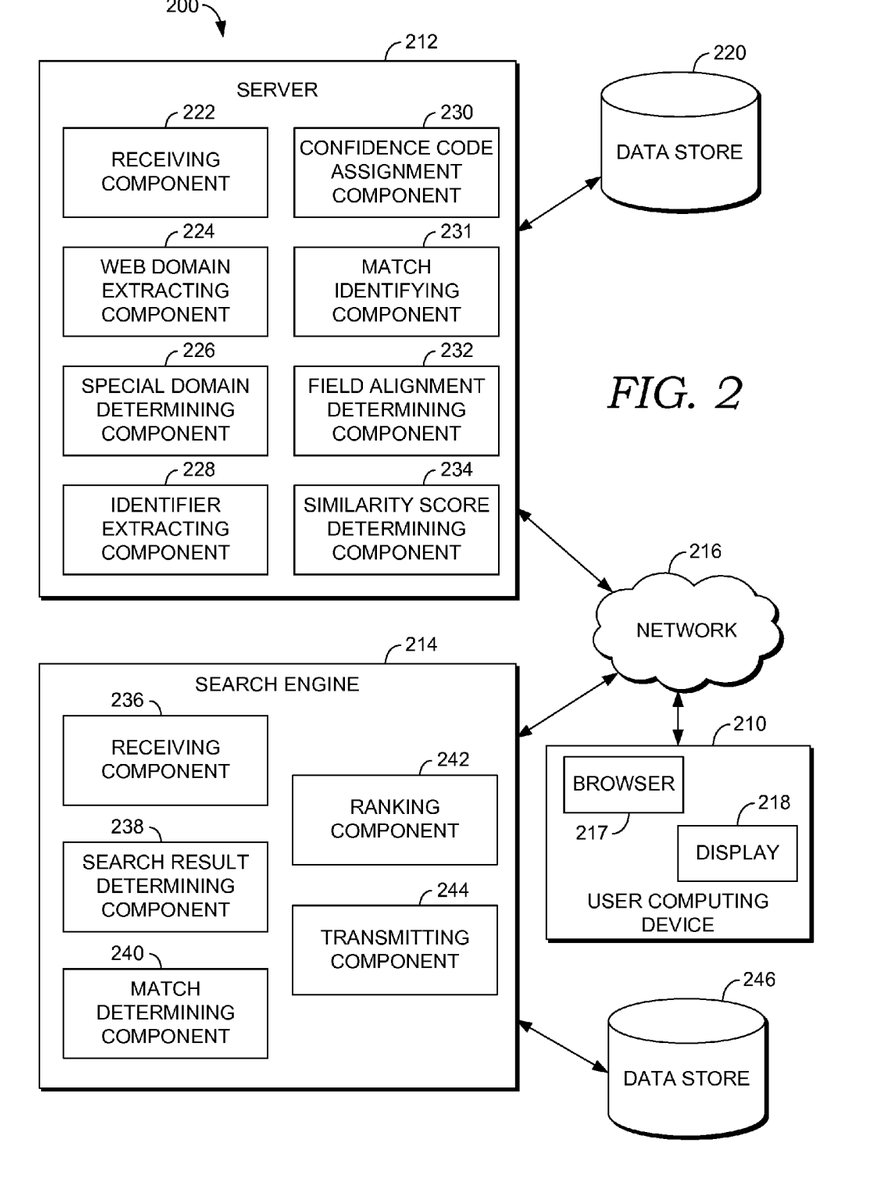
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which social signals (interest indications such as "likes," "check-ins," fan status, and the like) may be utilized to determine and/or rank local search results. Among other components not shown, the computing system 200 generally includes a user computing device 210, a server 212, and a search engine 214, all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

It should be understood that any number of user computing devices 210, servers 212 and/or search engines 214 may be employed in the computing system 200 within the scope of embodiments of the present invention. Each may comprise a single device/interface or multiple devices/interfaces cooperating in a distributed environment. For instance, the server 212 may comprise multiple devices and/or modules arranged in a distributed environment that collectively provide the functionality of the server 212 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via the user computing device 210, the server 212, the search engine 214, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers, search engines and/or user computing devices. By way of example only, the search engine 214 might be provided as a single computing device (as shown), a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user computing device 210 may include any type of computing device, such as the computing device 100 described with reference to FIG. 1, for example. Generally, the user computing device 210 includes a browser 217 and a display 218. The browser 217, among other things, is configured to render search engine home pages (or other online landing pages), social network web pages, and search engine results pages (SERPs), local or otherwise, in association with the display 218 of the user computing device 210. The browser 217 is further configured to receive user input of requests for various web pages (including search engine home pages), receive user input search queries (generally input via a user interface presented on the display 218 and permitting alpha-numeric and/or textual input into a designated search input region) and to receive content for presentation on the display 218, for instance, from the search engine 214. It should be noted that the functionality described herein as being performed by the browser 217 may be performed by any other application, application software, user interface, or the like capable of rendering Web content. Any and all such variations, and any combination thereof, are contemplated to be within the scope of embodiments of the present invention.

The server 212 of FIG. 2 is configured to determine social network website addresses that align with local entity website addresses and social network profiles that align with local entity index records. This information may then be utilized in ranking local entity website addresses and/or local entity index records with respect to algorithmically derived search results, as more fully described below with reference to the search engine 214. As illustrated, the server 212 includes a receiving component 222, a web domain extracting component 224, a special domain determining component 226, an identifier extracting component 228, a confidence code assigning component 230, a match identifying component 231, a field alignment determining component 232, and a similarity score determining component 234. The illustrated server 212 also has access to a data store 220. The data store 220 is configured to store information related to social networks, local entity index records, local entity websites, and the like. In various embodiments, such information may include, without limitation, social network website addresses, local entity website addresses, social interest indicators or signals, local entity index records, identities of special domains, threshold values as they apply to determinations of special domains, and the like. In embodiments, the data store 220 is configured to be searchable for one or more of the items stored in association therewith. It will be understood and appreciated by those of ordinary skill in the art that the information stored in association with the data store 220 may be configurable and may include any information relevant to social networks and local entities. The content and volume of such information are not intended to limit the scope of embodiments of the present invention in any way. Further, though illustrated as a single, independent component, the data store 220 may, in fact, be a plurality of storage devices, for instance a database cluster, portions of which may reside in association with the server 212, the user computing device 210, another external computing device (not shown), and/or any combination thereof.

The receiving component 222 of the server 212 is configured to receive a plurality of local entity website addresses, each local entity website address being associated with a local entity, for instance, a person, a business entity or the like. In embodiments, the local entity website address is a corporate address associated with the entity. The receiving component 222 further is configured to receive a plurality of social network website addresses, at least a portion of which are associated with one or more social signals or interest indications. In embodiments, at least a portion of the social network website addresses represent particular web pages within a social network site that relate to particular entities. The social signals and/or interest indications represent any user indication of a like or dislike, for instance, "likes," "check-ins," fan status, and the like associated with FaceBook® would be considered social signals or interest indications in accordance with embodiments hereof.

Still further, the receiving component 222 is configured to receive social network profiles. As utilized herein, "profile" is intended to refer not to a particular record having the label "profile" but rather to a set of information related to a particular entity that includes identifying information for the entity, for instance, website address, name, description, physical address, geo codes, phone number, etc. Any manner in which such identifying information may be presented and accessible by the server 212 is considered a "profile" in accordance with embodiments hereof. In embodiments, at least a portion of the social network profiles include one or more first information fields (for instance, information fields aligned with each item of identifying information (e.g., name, physical address, phone number, and the like)). In embodiments, at least a portion of the information fields have a value associated therewith. That is, in embodiments, at least a portion of the information fields comprising the profile have appropriate identifying information associated therewith. By way of example, if the first information field is related to an entity name, the name of the entity would be the value associated therewith.

The receiving component 222 further is configured to receive records associated with a local entity index. As with the term "profile," use of the term "record" herein is intended to refer not to a particular record having that label but rather to a set of information related to a particular entity and stored in association with a local entity index that includes identifying information for the entity, for instance, name, description, physical address, geo codes, phone number, etc. Any manner in which such identifying information may be presented and accessible by the server 212 is considered a "record" in accordance with embodiments hereof. In embodiments, at least a portion of the records include one or more second information fields (for instance, information fields aligned with each item of identifying information (e.g., name, physical address, phone number, and the like)). As with the first information fields, the second information fields generally align with identifying information associated with a local entity, for instance, name, physical address, phone number, and the like. In embodiments, at least a portion of the second information fields have a value associated therewith.

The web domain extracting component 224 of the server 212 is configured to extract web address domains from website addresses. For instance, the web domain extracting component 224 is configured to extract a first web address domain from one or more local entity website addresses and to extract a second web address domain from one or more social network website addresses. The extracted web domains are then utilized to determine whether a domain associated with a website address is a special domain, as more fully described below.

The special domain determining component 226 of the server 212 is configured to examine extracted web address domains (for instance, web address domains extracted utilizing the web domain extracting component 224) and determine whether the extracted web address domain is a special domain. In embodiments, a web address domain is determined to be a special domain if it is common among a large number of website addresses, for instance, if it is common among a threshold number of website addresses. In embodiments, the special domain determining component 226 is configured to determine whether a given web address domain is a special domain via comparison of an extracted web address domain to a list of known special domains.

The identifier extracting component 228 of the server 212 is configured to extract identifiers from local entity website addresses and from social network website addresses. In embodiments, upon determining that a particular web address domain is special, the identifier extracting component 228 is configured to extract an identifier from one of a local entity website address or a social network website address associated with the special web address domain. The identifier is utilized to help identify particular entities as associated with particular websites when the web address domain associated therewith is so popular that it itself does not appreciably aid in identification. Such is more fully described below with respect to the confidence code assigning component 230.

The confidence code assigning component 230 of the server 212 is configured to assign confidence codes to local entity website addresses and social network website addresses. In embodiments, if an extracted web address domain associated with a local entity website address or a social network website address is determined to be special (that is, determined to be so popular as to not appreciably aid in identifying an entity associated with a website address), the confidence code assigning component 230 is configured to assign a confidence code that comprises an extracted identifier (e.g., an identifier extracted via the identifier extracting component 228) and the web address domain. However, if an extracted web address domain associated with a local entity website address or a social network website address is determined to not be special, the confidence code assigning component 230 is configured to assign a confidence code that comprises the web address domain without a corresponding identifier.

The match identifying component 231 of the server 212 is configured to identify potential matches between one or more of the plurality of local entity website addresses and one or more of the plurality of social network website addresses based upon matching of the respective confidence codes. The match identifying component 231 is further configured to identify a potential match between a local entity website address and a social network website address as an actual match if the respective web address domains are special and the respective confidence codes match. Still further, the match identifying component 231 is configured to identify a potential match between a local entity website address and a social network website address as an actual match if the respective web address domains are not special and the local entity website address is a subpage of the social network website address.

Figure 5:
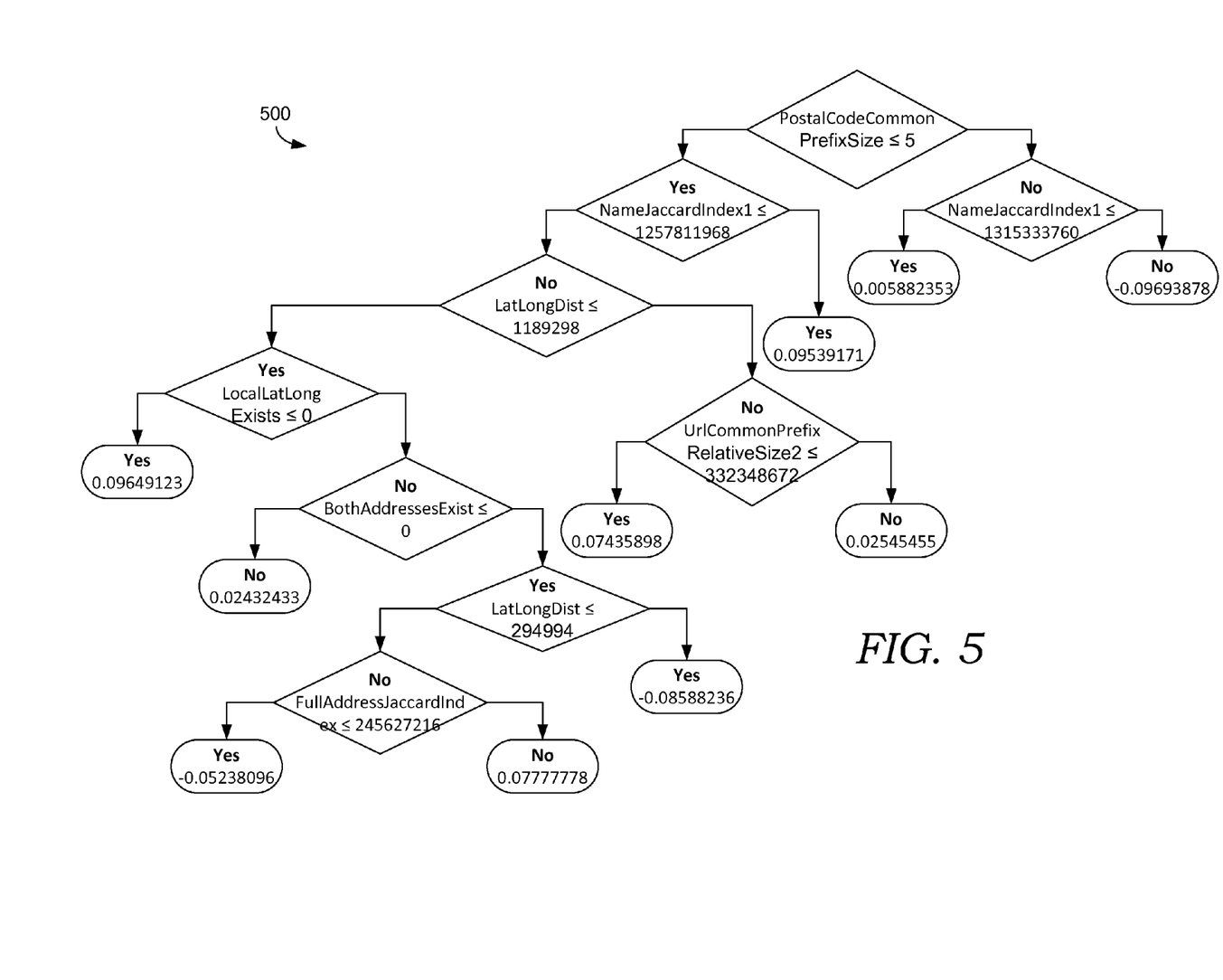
FIG. 5 is a schematic diagram showing a decision tree for matching social network profiles with local entity index records, in accordance with an embodiment of the present invention.

The field alignment determining component 232 of the server 212 is configured to determine that one or more first information fields (associated with a social network profile) and one or more second information fields (associated with a record in a local entity index) align with one another. Based on the degree of alignment between the first and second information fields, the similarity score determining component 234 of the server 212 is configured to determine a similarity score for the social network profile and the local entity index record by calculating a similarity metric for each pair of aligned first and second information fields, based upon respective values associated therewith. That is, the similarity score determining component 234 is configured to calculate a similarity score for the social network profile/local entity index record pair to aid in determining how similar the two are and, thus, whether the two reference the same entity. An exemplary decision tree 500 showing field alignments and calculation of similarity scores based on such is illustrated in FIG. 5.

The search engine 214 of FIG. 2 is configured to receive local search queries (for instance, through the browser 217 associated with the user computing device 210) and determine search results determined to be relevant to the search query. In embodiments, at least a portion of the determined search results are determined, at least in part, based upon actions taken by the server 212. As illustrated, the search engine 214 includes a receiving component 236, a search result determining component 238, a match determining component 240, a ranking component 242 and a transmitting component 244. The illustrated search engine 214 also has access to a data store 246. The data store 246 is configured to store information related to input search queries and potential results thereof. In various embodiments, such information may include, without limitation, search query logs, and the like. In embodiments, the data store 246 is configured to be searchable for one or more of the items stored in association therewith. It will be understood and appreciated by those of ordinary skill in the art that the information stored in association with the data store 246 may be configurable and may include any information relevant to search queries and potential search results. The content and volume of such information are not intended to limit the scope of embodiments of the present invention in any way. Further, though illustrated as a single, independent component, the data store 246 may, in fact, be a plurality of storage devices, for instance a database cluster, portions of which may reside in association with the search engine 214, the user computing device 210, another external computing device (not shown), and/or any combination thereof.

The receiving component 236 of the search engine 214 is configured to receive user input search queries (generally input via a user interface presented on the display 218 and permitting alpha-numeric and/or textual input into a designated search input region). In embodiments of the present invention, the received search queries are local search queries, that is, search queries for which an inputting user desires local search results.

The search result determining component 238 of the search engine 214 is configured to determine a plurality of potential search results determined to be relevant to the input search query. At least a portion of the determined search results are generally algorithmically derived based upon various search algorithms known to those of ordinary skill in the art and not further described herein.

The match determining component 240 of the search engine 214 is configured to determine that there is an actual match between a local entity website address and a social network website address. The match determining component 240 is further configured to determine that there is an actual match between a social network profile and a record associated with a local entity index. In embodiments, a potential match between a local entity website address and a social network website address is determined to be an actual match if the respective web address domains are special and the respective confidence codes match. In embodiments, a potential match between a local entity website address and a social network website address is determined to be an actual match if the respective web address domains are not special and the local entity webpage address is a subpage of the social network website address (e.g., "harrods.com/shoes" is a subpage of "harrods.com").

Note that the functionality of the match determining component 240 of the search engine 214 is similar to that of the match identifying component 231 of the server 212. Accordingly, one of the match identifying component 231 and the match determining component 240 may not be included within the system 200 in accordance with embodiments of the present invention. Alternatively, the functionality of the match identifying component 231 and the match determining component 240 may be split between the server 212 and the search engine 214. Any and all such variations, and any combination thereof, are contemplated to be within the scope of embodiments of the present invention.

Figure 6:
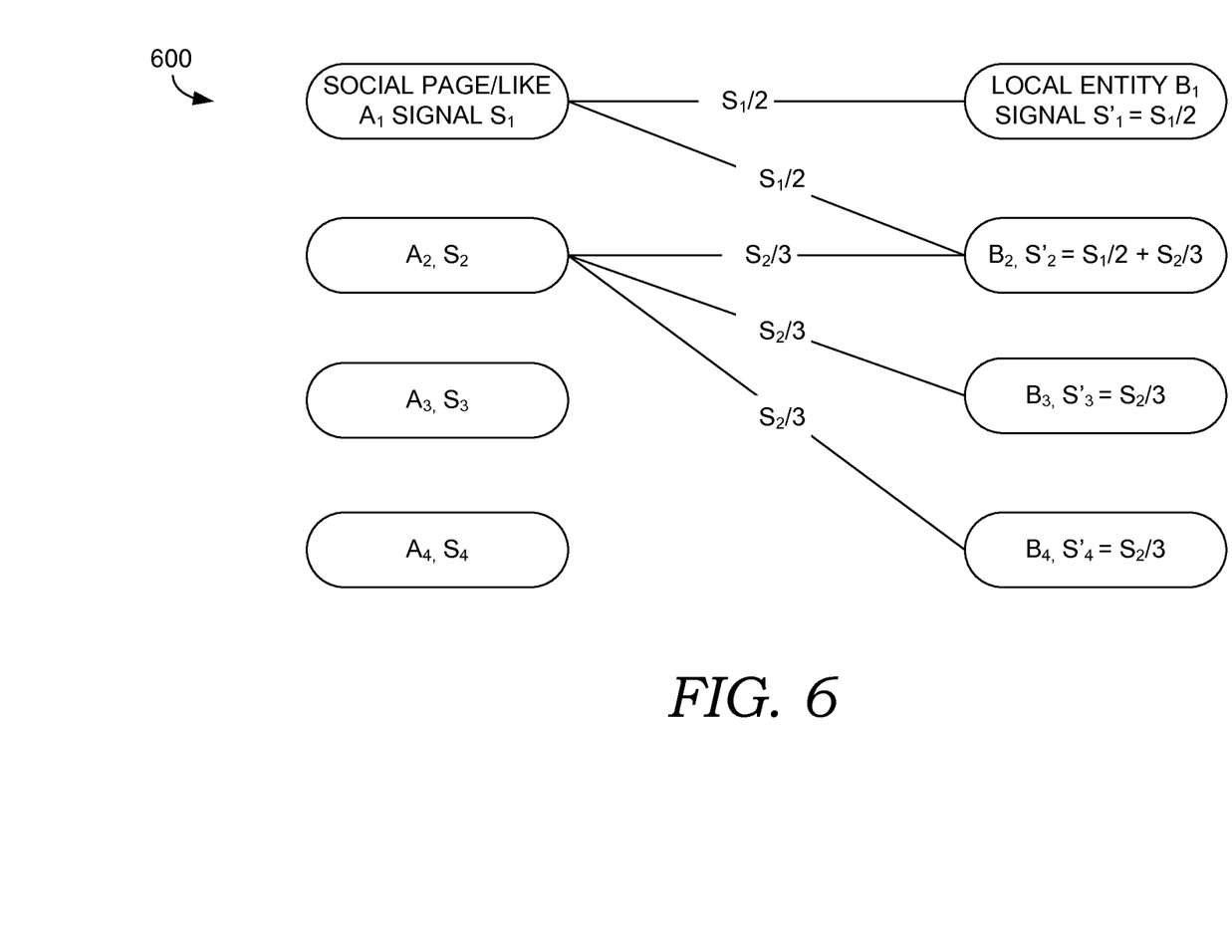
FIG. 6 is a schematic diagram showing that social interest indications that may be associated with several local entities may provide a contribution to each of them, in accordance with an embodiment of the present invention.

The ranking component 242 of the search engine 214 is configured to rank potential search results relative to one another in terms of relevance. In embodiments, the ranking component 242 is configured to rank potential search results, at least in part, based upon social signals or interest indications related to an entity that corresponds to the respective search result. That is, in embodiments, the ranking component 242 is configured to utilize interest indications associated with social network profiles and/or social network website addresses in ranking the social network profiles and/or social network website address relative to others of a plurality of search results. Interest indications that may be associated with multiple entities (e.g., multiple subpages of a particular local entity website address) may be divided among the multiple entities, as shown in the schematic diagram 600 of FIG. 6.

The transmitting component 244 of the search engine 214 is configured to transmit determined search results for presentation in association with a client computing device, for instance, in association with the display 218 of the user computing device 210.

Figure 3A:
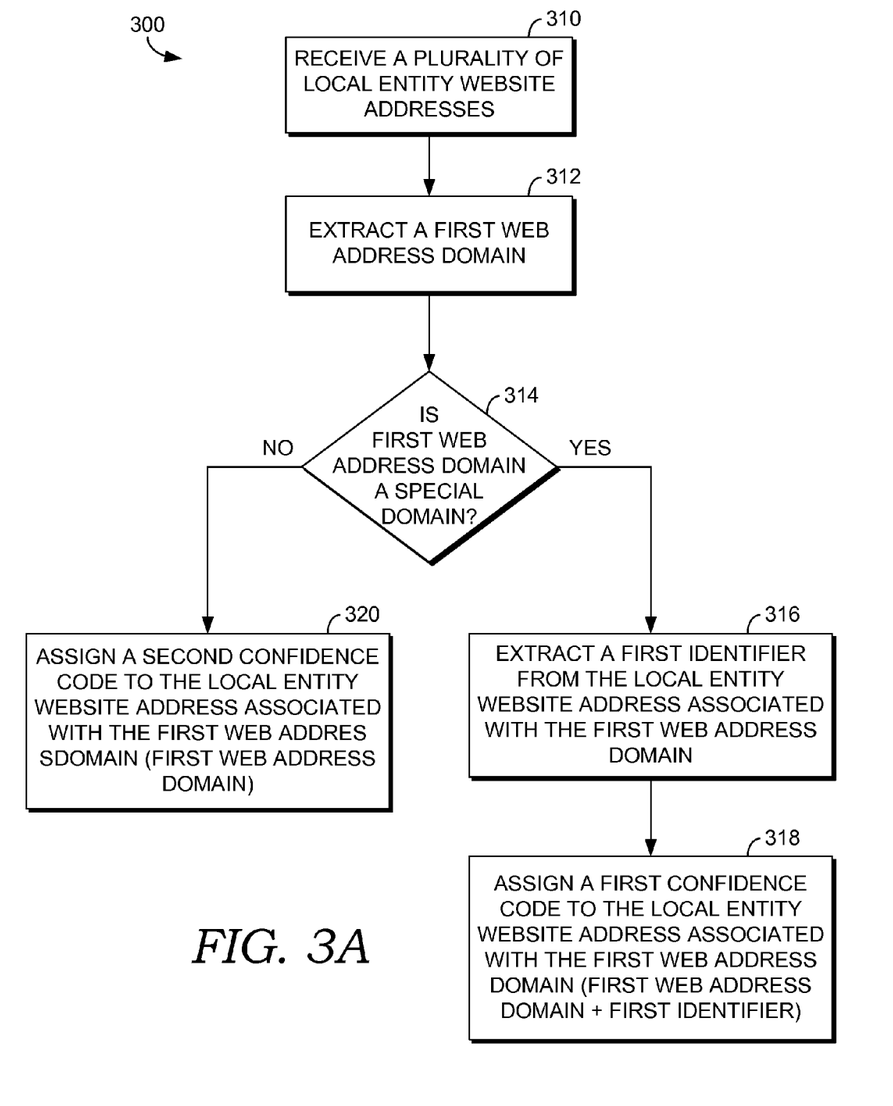
FIGS. 3A, 3B, and 3C are a flow diagram showing an exemplary method for matching local entity website addresses with social network website addresses, in accordance with an embodiment of the present invention.

Turning now to FIG. 3A, a flow diagram is illustrated showing an exemplary method 300 for matching local entity website addresses with social network website addresses. As indicated at block 310, a plurality of local entity website addresses is received. Each local entity website address is associated with a local entity. For each of the plurality of local entity website addresses, a first web address domain is extracted, as indicated at block 312. As indicated at decision block 314, it is determined whether the first web address domain is a special domain (that is, if the first web address domain is common among a threshold number of website addresses). If it is determined that the first web address domain is a special domain, a first identifier is extracted from the local entity website address associated with the first web address domain, as indicated at block 316, and a first confidence code is assigned to the local entity website address associated with the first web address domain, as indicated at block 318. The first confidence code comprises the first web address domain and the first identifier.

If it is determined at decision block 314 that the first web address domain is not a special domain, a second confidence code is assigned to the local entity website address associated with the first web address domain, as indicated at block 320.

In this instance, the second confidence code comprises the first web address domain without a corresponding identifier.

Figure 3B:
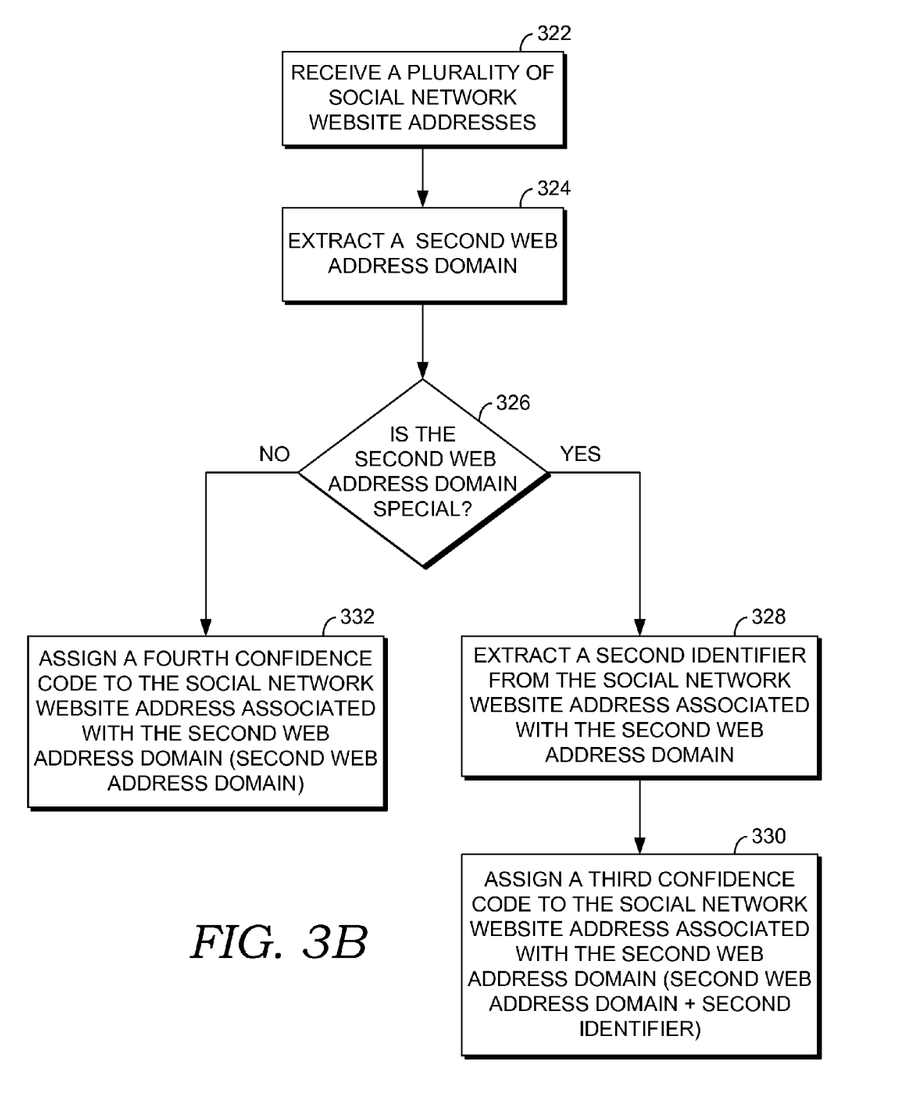

Turning now to FIG. 3B, a flow diagram is illustrated showing a continuation of the exemplary method 300 for matching local entity website addresses with social network website addresses of FIG. 3A. As indicated at block 322, a plurality of social network website addresses is received. Each social network website address is associated with one or more interest indications or social signals (e.g., "likes," "checkins," fan status, and the like). As indicated at block 324, a second web address domain is extracted for each of the plurality of social network website addresses. It is then determined whether the extracted second website address domain is a special domain (that is, if the second web address domain is common among a threshold number of website addresses). If it is determined that the second web address domain is a special domain, a second identifier is extracted from the social network website address associated with the second web address domain, as indicated at block 328, and a third confidence code is assigned to the social network website address associated with the second web address domain, as indicated at block 330. The third confidence code comprises the second web address domain and the second identifier.

If it is determined at decision block 326 that the second web address domain is not a special domain, a fourth confidence code is assigned to the social network website address associated with the second web address domain, as indicated at block 332. In this instance, the fourth confidence code comprises the second web address domain without a corresponding identifier.

Figure 3C:
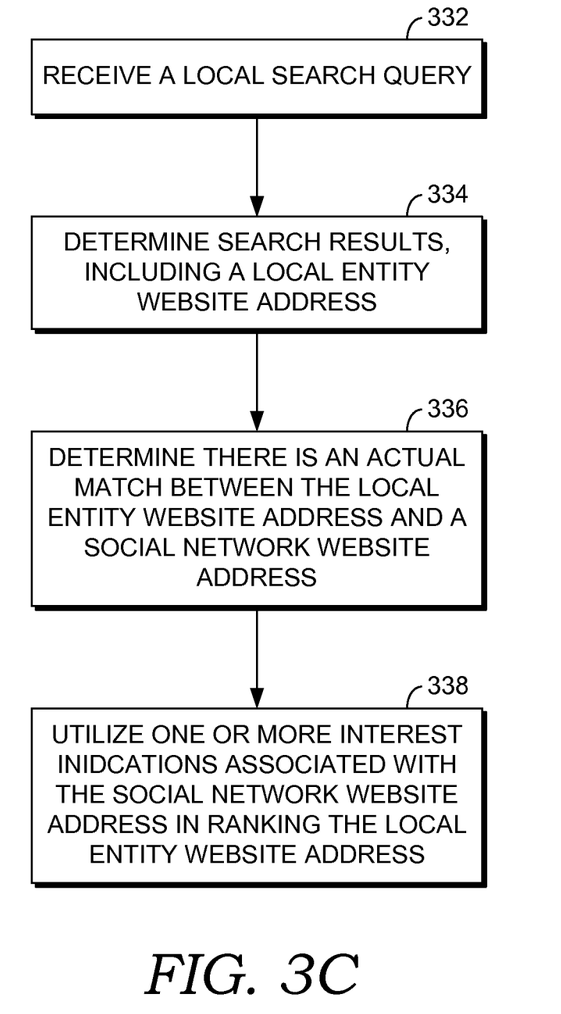

Turning now to FIG. 3C, a flow diagram is illustrated showing a continuation of the exemplary method 300 for matching local entity website addresses with social network website addresses of FIGS. 3A and 3B. As indicated at block 332, a local search query is received, for instance, from user computing device 210 of FIG. 2. A plurality of search results is determined, as indicated at block 334. At least one local entity website address is included among the plurality of search results. As indicated at block 336, it is determined that there is an actual match between the local entity website address included among the plurality of search results and a social network website address. One or more interest indications associated with the social network website address is then utilized in ranking the local entity website address relative to others of the plurality of search results, as indicated at block 338.

Figure 4A:
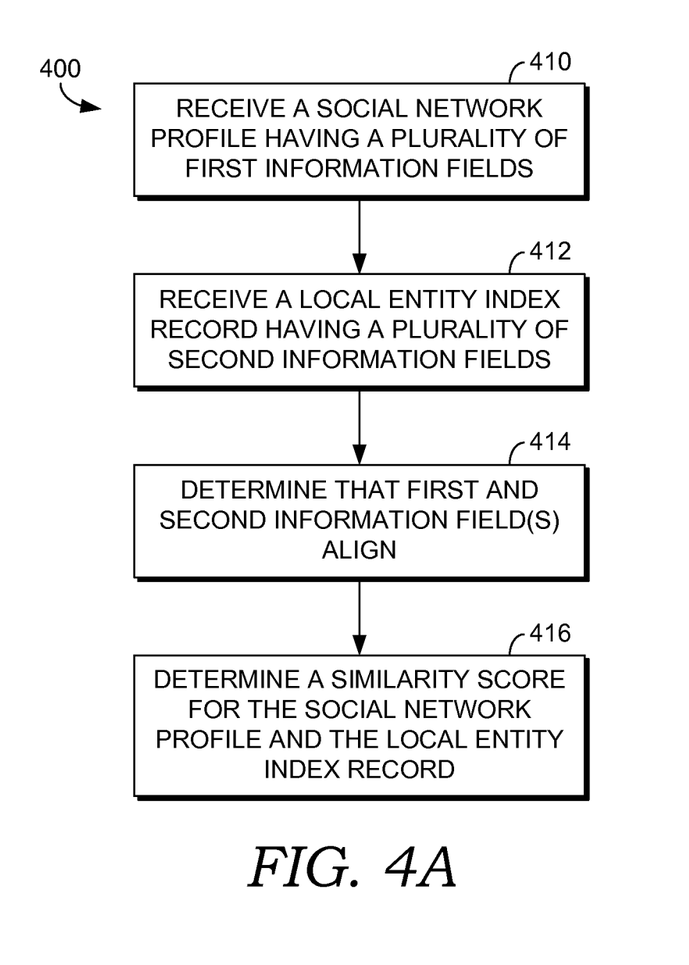
FIGS. 4A and 4B are a flow diagram showing another exemplary method for matching social network profiles with local entity index records, in accordance with an embodiment of the present invention.

With reference now to FIG. 4A, a flow diagram is illustrated showing an exemplary method 400 for matching social network profiles with local entity index records, in accordance with an embodiment of the present invention. As indicated at block 410, a social network profile is received, the social network profile including a plurality of first information fields. At least a portion of the first information fields have a value associated therewith. As indicated at block 412, a record associated with a local entity index is received, the record including a plurality of second information fields. At least a portion of the second information fields have a value associated therewith. As indicated at block 414, it is determined that one or more of the plurality of first information fields align with one or more of the plurality of second information fields. A similarity score is then determined for the social network profile and the record associated with the local entity index by calculating a similarity metric for each pair of aligned first and second information fields based upon respective values associated therewith. This is indicated at block 416. If the determined similarity score is above a threshold value, the social network profile and the record associated with the local entity index are determined to match.

Figure 4B:
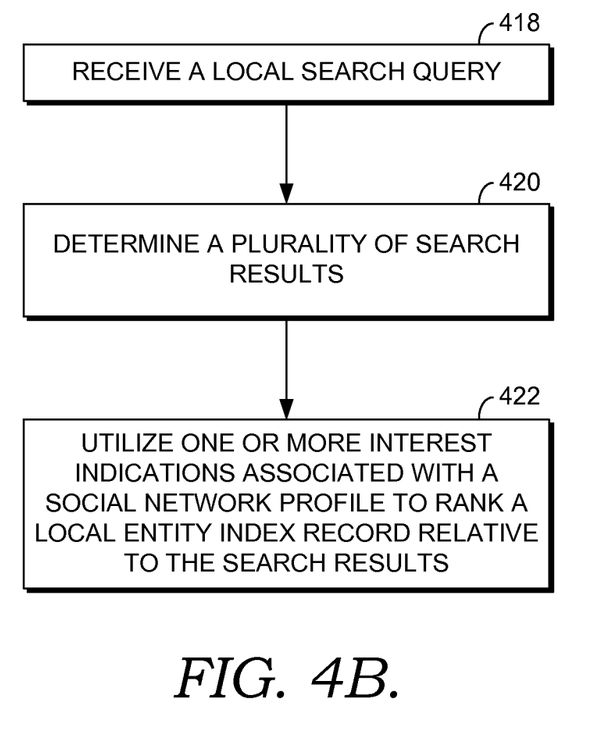

With reference now to FIG. 4B, a flow diagram is illustrated showing a continuation of the exemplary method 400 for matching social network profiles with local entity index records of FIG. 4A. As indicated at block 418, a local search query is received. A plurality of search results that are relevant to the received query are then determined, as indicated at block 420. One or more interest indications associated with the social network profile are then utilized to rank the record associated with the local entity index relative to the plurality of search results. This is indicated at block 422. In embodiments, the record associated with the local entity index does not have an associated website address other than the social network profile.

As can be understood, embodiments of the present invention provide systems, methods, and computer-readable storage media for, among other things, using social signals (social interest indications) to determine and rank local search results. Utilizing embodiments hereof, the social network popularity of an entity may be taken into account in determining whether to provide information about the entity as a search result or in addition to one or more search results. Additionally, ranking may be improved for entities having incomplete or erroneous information available in association with a social network and for entities having a strong social network presence but a limited web presence The present invention has been described in relation to particular embodiments, which are intended in all respects to be illustrative rather than restrictive. Alternative embodiments will become apparent to those of ordinary skill in the art to which the present invention pertains without departing from its scope. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 300 of FIGS. 3A, 3B and 3C and 400 of FIGS. 4A and B is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer-readable storage media storing computer-useable instructions that, when used by one or more computing devices, cause the one or more computing devices to match local entity website addresses with social network website addresses, the instructions configured to:
receive a plurality of local entity website addresses, each local entity website address being associated with a local entity;
for each of the plurality of local entity website addresses:
extract a first web address domain from each website address;
determine whether the first web address domain is a special domain, a web address domain being special if it is common among a threshold number of web site addresses;
upon determining that a first web address domain is special, extract a first identifier from the local entity website address associated with the first web address domain, the first identifier identifying the local entity associated with the local entity website address, and assign a first confidence code to the local entity website address associated with the first web address domain, the first confidence code comprising the first web address domain and the first identifier;

receive a plurality of social network website addresses, each associated with one or more interest indications;

for each of the plurality of social network website addresses:

extract a second web address domain;

determine whether the second web address domain is special;

upon determining that the second web address domain is special, extract a second identifier from the social network website address associated with the second web address domain; and assign a second confidence code to the social network website address associated with the second web address domain, the second confidence code comprising the second web address domain and the second identifier; and identify potential matches between one or more of the plurality of local entity website addresses and one or more of the plurality of social network website addresses based upon matching of the respective first and second confidence codes.

2. The one or more computer-readable storage media of claim 1, wherein a potential match between one of the local entity website addresses and one of the social network website addresses is defined as an actual match if the respective first and second web address domains are special and the respective first and second confidence codes match.

3. The one or more computer-readable storage media of claim 1, wherein a potential match between one of the local entity website addresses and one of the social network website addresses is defined as an actual match if the respective first and second web address domains are not special and the local entity website address is a subpage of the social network website address.

4. The one or more computer-readable storage media of claim 1, wherein the instructions are further configured to:

receive a local search query;

determine a plurality of search results, including at least one of the plurality of local entity website addresses;

determine that there is an actual match between the at least one of the plurality of local entity website addresses and one of the plurality of social network website addresses; and utilize the one or more interest indications associated with the one of the plurality of social network website addresses in ranking the at least one of the plurality of local entity website addresses relative to others of the plurality of search results.

5. The one or more computer-readable storage media of claim 1, wherein the one or more social signals or interest indications comprise at least one of a like, checkin, or fan status.

6. The one or more computer-readable storage media of claim 1, wherein the instructions are further configured to:

receive a local search query;

determine a plurality of search results, including at least one of the plurality of local entity website addresses; and utilize the one or more interest indications associated with the plurality of social network website addresses in ranking the at least one of the plurality of local entity website addresses relative to others of the plurality of search results.

7. A method for matching social network profiles with local entity index records, the method comprising:

receiving a social network profile, the social network profile including a plurality of first information fields, at least a portion of the plurality of first information fields having a value associated therewith, the social network profile including a first web address domain extracted from a social network website address;

receiving a record associated with a local entity index, the record including a plurality of second information fields, at least a portion of the plurality of second information fields having a value associated therewith, the record including a second web address domain extracted from a local entity website address;

determining that one or more of the plurality of first information fields align with one or more of the plurality of second information fields; and determining a similarity score for the social network profile and the record associated with the local entity index by calculating a similarity metric for each pair of aligned first and second information fields based upon respective values associated therewith:, at least one of the first web address domain or the second web address domain being special, the first web address domain or second web address domain being special if it is common among a threshold number of web site addresses.

8. The method of claim 7, wherein if the determined similarity score is above a threshold value, the social network profile and the record associated with the local entity index are determined to match.

9. The method of claim 7, wherein one or more interest indications are associated with the social network profile.

10. The method of claim 9, wherein the method further comprises:

receiving a local search query;

determining a plurality of search results; and utilizing the one or more interest indications associated with the social network profile to rank the record associated with the local entity index relative to the plurality of search results.

11. The method of claim 10, wherein the record associated with the local entity index does not have an associated website address other than the social network profile.

12. The method of claim 7, wherein the one or more social signals or interest indications comprise at least one of a like, checkin, or fan status.

13. The method of claim 7, wherein the plurality of first information fields comprise one or more of a name, physical address, or phone number.

14. A system comprising:

a server having one or more processors and one or more computer-readable storage media, the computer-readable storage media having computer-executable instructions stored thereon that, when executed by the one or more processors, match local entity website addresses with social network website addresses, the instructions configured to:

receive a plurality of local entity website addresses, each local entity website address being associated with a local entity;

receive a plurality of social network website addresses, at least a portion of the social network website addresses being associated with one or more social signals or interest indications, the one or more social signals or interest indications comprising at least one of a like, checkin, or fan status;
identify matches between one or more of the plurality of local entity website addresses and one or more of the plurality of social network website addresses;
for each of the plurality of local entity website addresses:
extract a first web address domain from each website address;
determine whether the first web address domain is a special domain; and
upon determining that a first web address domain is special, extract a first identifier from the local entity website address associated with the first web address domain; and
assign a first confidence code to the local entity website address associated with the first web address domain, the first confidence code comprising the first web address domain and the first identifier,
a first web address domain is being special if it is common among a threshold number of website addresses; and
for each of the plurality of social network website addresses:
extract a second web address domain;
determine whether the second web address domain is special;
upon determining that the second web address domain is special, extract a second identifier from the social network website address associated with the second web address domain; and
assign a second confidence code to the second web address domain, the second confidence code comprising the second web address domain and the second identifier; and
a search engine configured to:
receive a local search query; and
determine a plurality of search results, including at least one of the plurality of local entity website addresses.

15. The system of claim 14, wherein a second web address domain is special if it is common among a threshold number of website addresses.

16. The system of claim 14, wherein the instructions are further configured to:
receives a plurality of social network profiles, at least a portion of the social network profiles including one or more first information fields;
receives records associated with a local entity index, at least a portion of the records including one or more second information fields;
determines that one or more of the plurality of the one or more first information fields align with one or more of the plurality of the one or more second information fields; and
determines a similarity score for a social network profile and a record associated with the local entity index by calculating a similarity metric for each pair of aligned first and second information fields based upon respective values associated therewith.

17. The system of claim 16, further comprising:
the search engine further configured to
determine that there is an actual match between the at least one of the plurality of local entity website addresses and one of the plurality of social network website addresses.

18. The system of claim 16, further comprising:
the search engine further configured to
utilizes the one or more first information fields associated with the plurality of social network profiles to rank the record associated with the local entity index relative to the plurality of search results.

19. The system of claim 14, wherein the search engine is further configured to utilize the one or more social signals or interest indications associated with the one of the plurality of social network website addresses in ranking the at least one of the plurality of local entity website addresses relative to others of the plurality of search results.

20. The system of claim 14, wherein the one or more social signals or interest indications is associated with the social network profile.

* * * * *